Jan. 5, 1932.　　　　B. LAWRENCE　　　　1,839,322
METHOD OF AND APPARATUS FOR LAYING PIPE UNDER WATER
Filed Aug. 1, 1929　　　4 Sheets-Sheet 2
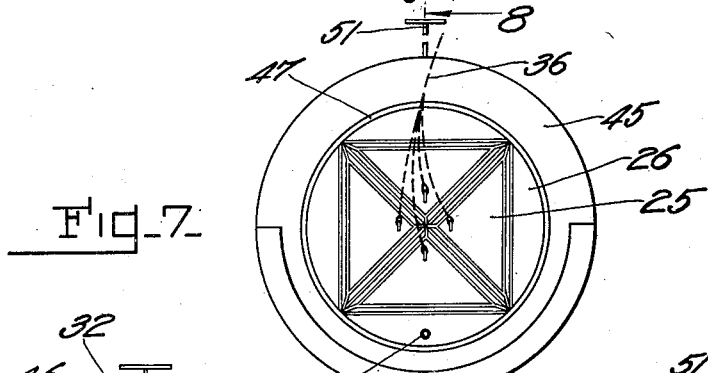
Fig. 7
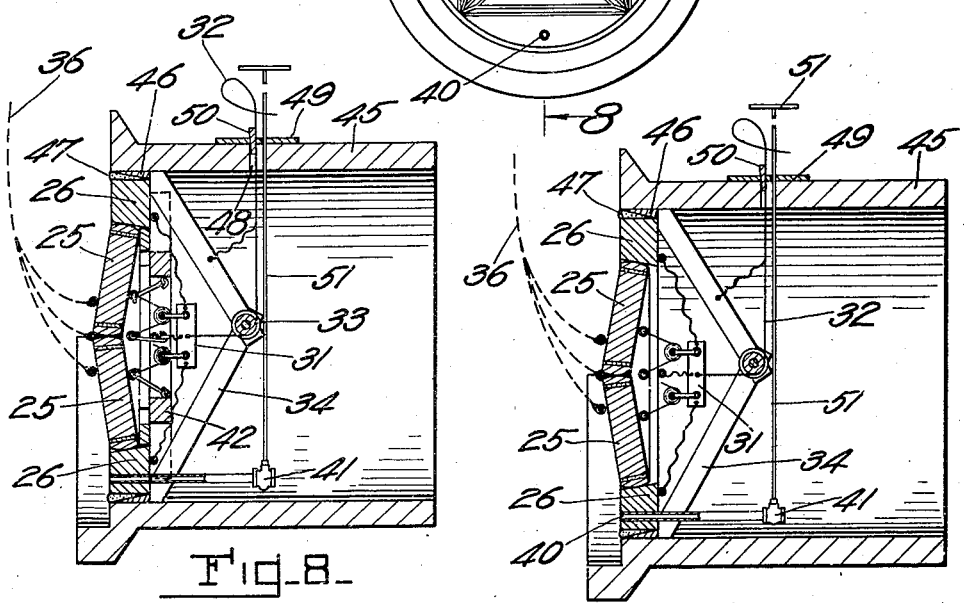
Fig. 8
Fig. 11
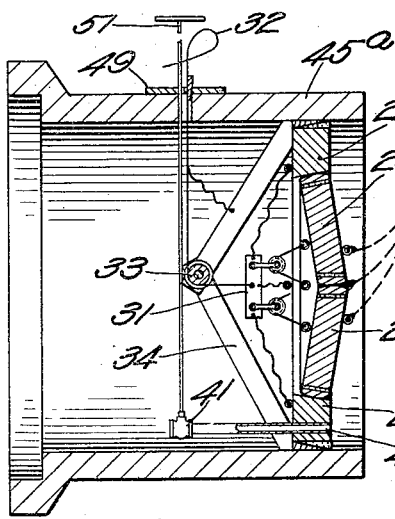
Fig. 12
Fig. 9
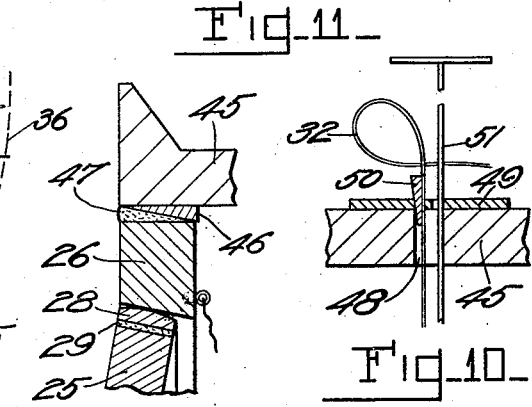
Fig. 10
INVENTOR
Brardsley Lawrence,
by Meadow, Calvr, Copeland + Dike,
Attys.

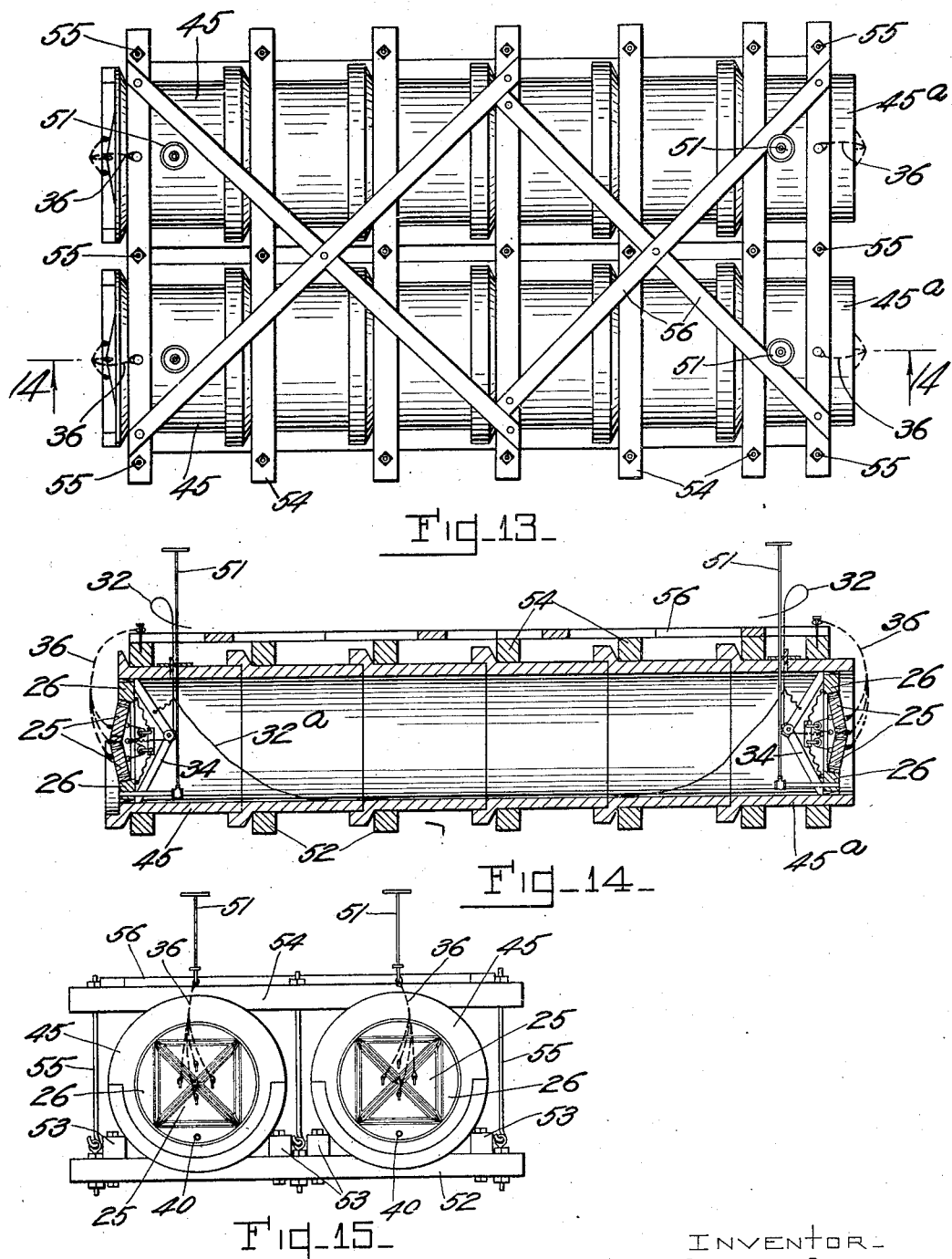

Jan. 5, 1932.   B. LAWRENCE   1,839,322
METHOD OF AND APPARATUS FOR LAYING PIPE UNDER WATER
Filed Aug. 1, 1929   4 Sheets-Sheet 4

INVENTOR:
Beardsley Lawrence,
by Meacham, Calver, Copeland & Dike.
Attys.

Patented Jan. 5, 1932

1,839,322

UNITED STATES PATENT OFFICE

BEARDSLEY LAWRENCE, OF SHARON, MASSACHUSETTS, ASSIGNOR TO T. STUART & SON COMPANY, OF NEWTON, MASSACHUSETTS, A CORPORATION OF MASSACHUSETTS

METHOD OF AND APPARATUS FOR LAYING PIPE UNDER WATER

Application filed August 1, 1929. Serial No. 382,668.

This invention relates to the laying of concrete and similar pipe in water, especially, although not exclusively, in relatively shallow water, for example for the purpose of forming culverts to carry the waters of tidal and other streams which are to be filled over.

In situations where it is necessary to lay heavy pipe of large dimensions in or under water, it has been proposed to close the ends of the pipe sections by temporary bulkheads to exclude the water, float each section into place over the end of the section last previously laid, and admit water to the floating section to cause the same to sink into its final position. When this method is employed, it is necessary, after a pipe section has been put into place, to send a diver down to remove the bulkheads, and especially the inner bulkhead closing the end of the newly laid section which adjoins the previously laid section, the diver being obliged to enter the pipe in order to perform the latter operation.

The present invention has for an object to provide a method which avoids the necessity of diving operations for the purpose of removing the bulkheads and in accordance with which both bulkheads are withdrawn by operations performed wholly at the surface. Another object is to provide an apparatus suitable for the practice of said method, said apparatus including a new and improved construction of collapsible bulkhead particularly adapted for use in this connection.

The foregoing and other objects of the invention and the precise nature thereof will best be understood from the following description in connection with the accompanying drawings. It will be understood, however, that the particular apparatus shown and operations described have been chosen for purposes of exemplification merely, and that the invention, as defined by the claims hereunto appended, may be otherwise embodied and practised without departure from the spirit and scope thereof.

In said drawings:

Fig. 7 is an end view of a pipe section having a bulkhead assembled in the bell end thereof.

Fig. 8 is an enlarged section taken substantially on the line 8—8, Fig. 7.

Figs. 9 and 10 are enlarged fragmentary detail views showing certain of the parts of the assembly shown in Fig. 8.

Fig. 11 is a view similar to Fig. 8 showing the parts after the removal of the erection frame.

Fig. 12 is a view similar to Fig. 11 showing a pipe section with the bulkhead assembled in the spigot end.

Fig. 13 is a plan view of two pipe units, each comprising a plurality of assembled pipe sections, said units being secured together in spaced parallel relation, ready to be floated into position, by means of suitable cribbing.

Fig. 14 is a vertical section taken substantially on the line 14—14, Fig. 13.

Fig. 15 is an end elevation of the assembly shown in Fig. 13.

Figure 1:
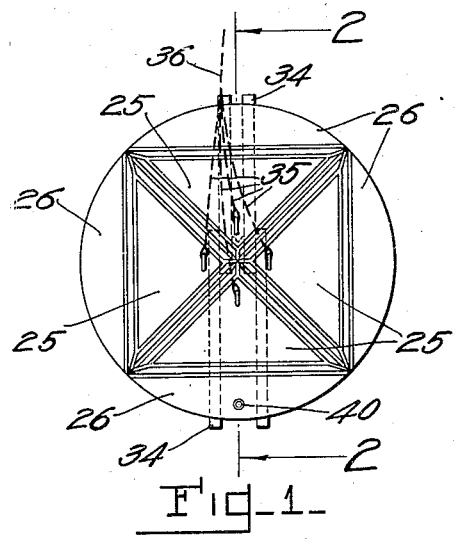
Fig. 1 is a front or end elevation of one of the collapsible bulkheads.
Figure 2:
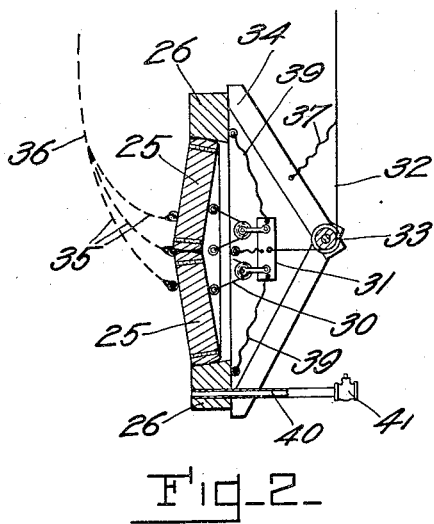
Fig. 2 is a longitudinal section taken substantially on the line 2—2, Fig. 1.

Referring to Figs. 1 and 2, each of the collapsible bulkheads comprises four triangular sections 25 and four segment-shaped sections 26 which, when assembled, form a circular structure, the sections 26 being shaped to fit the inner surface of a pipe and collectively extending completely thereabout, and the sections 25 being disposed in arched relationship with their bases engaging the inner edges of the sections 26. The several bulkhead sections are entirely separate but are loosely connected with one another in such a manner that when the bulkhead is collapsed they may all be withdrawn together instead of floating off separately. As shown, the sections 26 are of slightly greater thickness than the sections 25. The marginal edges of the sections 25 are faced by strips 28 (see particularly Fig. 9) of soft wood, such as cypress or the like, having rounded faces and backed by layers 29 of tarred felt. The sections 25 are, in the assembled bulkhead, connected by a rope or cable 30 with an equalizer 31 disposed at the concave side of the arch formed by said sections. The equalizer 31 has secured thereto a line 32 passing about a sheave 33 located at the knuckle of a toggle frame 34 whose ends engage the sections 26 as well as the inner face of the pipe, said toggle frame being disposed in opposition to the arch of the sections 25, as clearly shown in Fig. 2. The sections 25 are also connected with one another at the outer or convex side of the arch by lines 35 terminating in a single line 36. The members of the toggle frame 34 are connected to the line 32 by a loose connection 37, while the bulkhead sections 26 are similarly connected with the equalizer 31 by loose connections 39. It will therefore be seen that all of the parts of the bulkhead are connected with both lines 32 and 36, so that, when the bulkhead is collapsed, they may all be withdrawn together by either line. One of the sections 26 has passing therethrough a pipe 40 fitted with a suitable valve 41.

Figure 3:
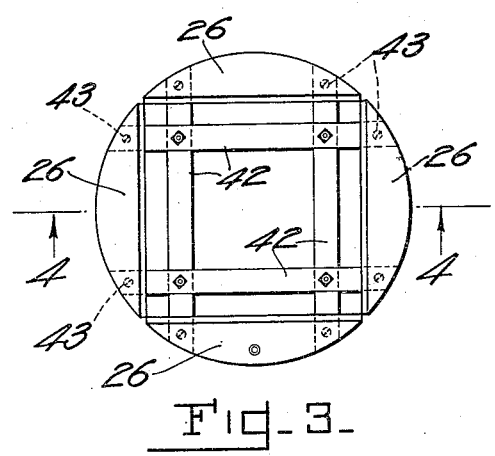
Fig. 3 is a plan view of one of the bulkhead erection frames, showing a bulkhead partly assembled thereon.
Figure 5:
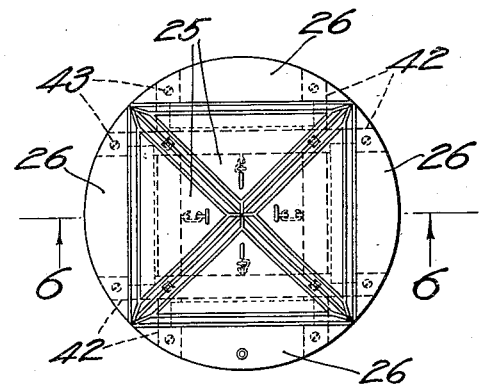
Fig. 5 is a view similar to Fig. 3 showing the completely assembled bulkhead sections.
Figure 4:
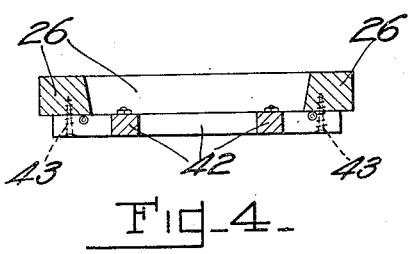
Fig. 4 is a section taken substantially on the line 4—4, Fig. 3.
Figure 6:
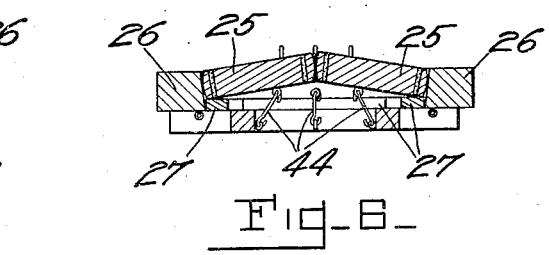
Fig. 6 is a section taken substantially on the line 6—6, Fig. 5.

For convenience in assembling the bulkhead, there is preferably provided an erection frame which, as shown in Figs. 3 to 6, comprise two pairs of parallel timbers 42 disposed at right angles to one another and suitably framed and secured together, said timbers being of such length that their ends fall within the circle defined by the assembled bulkhead. In assembling the bulkhead, the sections 26 are placed upon the ends of the timbers 42 and temporarily secured in place by screws 43, as shown in Figs. 3 and 4. The sections 25 are then placed upon the frame and temporarily secured thereto by hooks 44, the difference in thickness between the sections 25 and 26 being made up by spacers 27. The assembled bulkhead, together with the erection frame to which it is attached, is then inserted into the end of a pipe section 45, as shown in Fig. 8, and the toggle frame 34 placed in operative position. The space between the outer edges of the sections 26 and the inner periphery of the pipe is then calked by the use of wedges 46 and suitable calking material 47, as shown in detail in Fig. 9.

It will now be seen that if the line 32, which is disposed inwardly of the pipe section, be drawn taut and made fast, a force will be applied to the sections 25 longitudinally of the pipe and in a direction tending to flatten the arch, so that the toggle frame 34 and bulkhead sections will cooperate to exert a radial thrust outwardly upon the pipe and thereby wedge the sectional bulkhead firmly into its extended operative position and hold the same therein. It will also be seen that, by drawing upon the line 36, which is disposed outwardly of the pipe a force may be applied to the sections 25 in the opposite direction tending to collapse the bulkhead. It is customary to form pipe sections of this character with small openings 48 to receive the implements by which they are handled, which openings are subsequently plugged. The line 32 may therefore be conveniently passed upwardly through one of the openings 48 and made fast therein, preferably by passing the same through an opening in a board or plate 49 and securing the same thereto by a wedge 50, as shown most clearly in Fig. 10. The board or plate 49 may also be provided with a second opening through which and the opening 48 may be passed a suitable elongated wrench or detachable stem 51 for operating the valve 41, said stem being of sufficient length to extend substantially to the surface of the water when the pipe has been sunk.

After the line 32 has been made fast, as above explained, the erection frame and spacers 27 are removed by removing the screws 43 and hooks 44, leaving the parts in the position shown in Fig. 11.

While each pipe section 45 may, if desired, be fitted with a collapsible bulkhead at each end, a plurality of such sections are preferably assembled to form an elongated unit and the joints between them suitably cemented or caulked. In such case, one bulkhead will be assembled in the mouth of the bell end of the section at one end of the unit, as shown in Fig. 8, and a similar bulkhead assembled in the spigot end of the section 45a in the opposite end of the unit, as shown in Fig. 12, the lines 32 of the two bulkheads being connected with one another by a line 32a extending through the unit.

A unit assembled as above described may be assembled with one or more similar units, and held in spaced parallel relation thereto, by means of suitable cribbing, as shown in Figs. 13 to 15. Said cribbing as shown preferably comprises transverse bottom still members 52 upon which the several pipe sections rest and are laterally positioned by blocks 53, and similar top members 54 detachably connected with the bottom members 52 by hooks 55, said top members being, if desired, further braced by cross-diagonal timbers 56.

Figure 16:
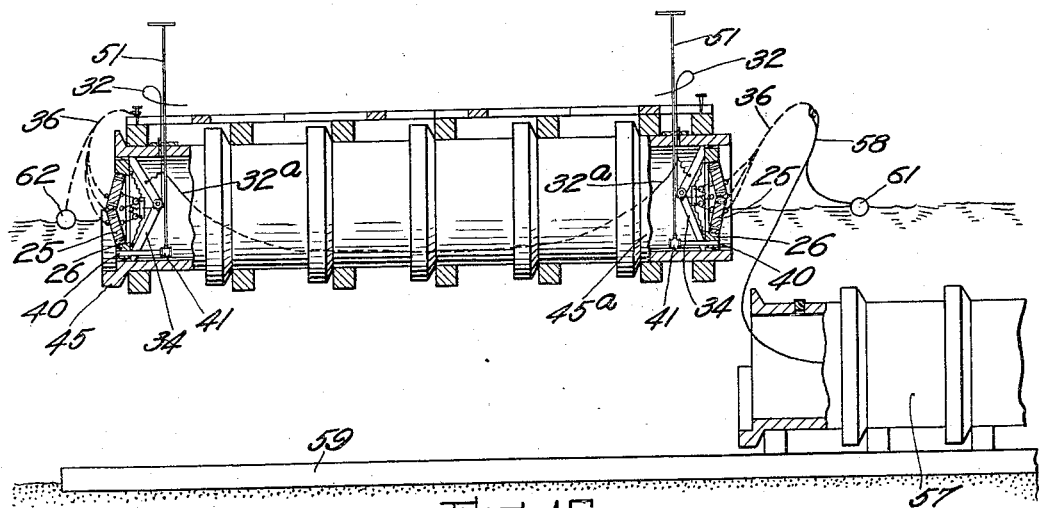
Fig. 16 is a diagrammatic sectional view illustrating the floating of the assembly shown in Figs. 13 to 15 into place adjacent the end of the previously laid pipe.

Due to the calking of the joints between the several sections of the units, and the bulkheads in the endmost sections thereof, said units are rendered substantially water tight and consequently buoyant. One or more of said units, assembled in a crib as above described, may then be floated into place immediately beyond the end of the pipe 57 previously laid, as shown in Fig. 16.

Figure 17:
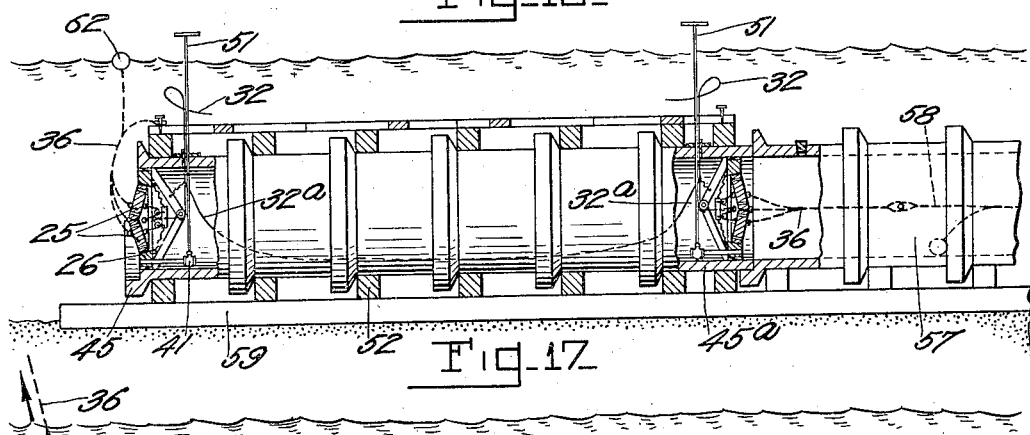
Fig. 17 is a similar view showing the units sunk into final position.
Figure 18:
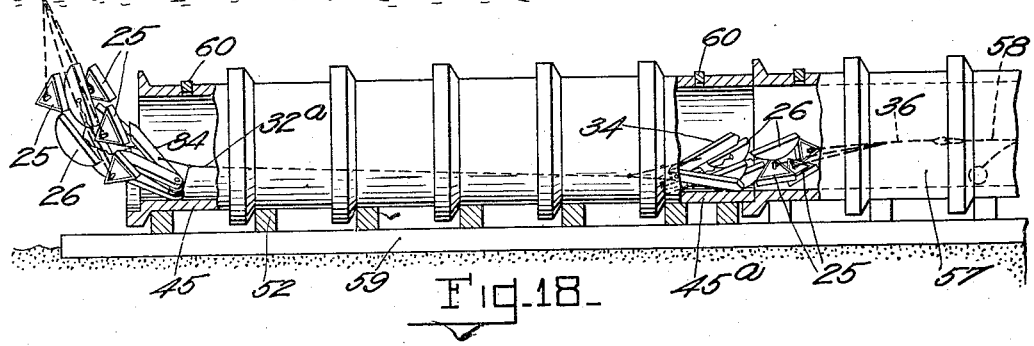
Fig. 18 is a similar view illustrating the collapsing and withdrawal of the bulkheads.

A line 58, passed through the previously laid pipe 57 from the end thereof, is then made fast to the line 36 of the inner bulkhead at the adjacent end of the new unit. If desired, the line 58 may for convenience, be provided with a suitable float 61, while the line 36 of the outer bulkhead may likewise be provided with a similar float 62. The valves 41 of the floating unit about to be laid are then operated, through the wrenches or stems 51, to admit water to said unit, such admission being carefully controlled to cause said unit to sink into place and join the end of the previously laid pipe as shown in Fig. 17, the length of the stems 51 being sufficient to maintain such control until the unit is fully sunk. To facilitate joining of the unit with the previously laid pipe, the bell at the bell end of each unit is preferably cut away at its upper side to permit the sinking of the spigot end of the adjoining unit into place. Either immediately prior to or after the sinking of the unit, depending upon the depth of the water, the top members 54 and cross braces 56 of the crib may be removed, but the bottom members 52 thereof are preferably sunk with the unit to provide supporting sills for the pipe on the previously prepared foundation 59.

After the sinking of the sections, the wrenches or stems 51 are removed, the wedges 50 dislodged to release or cast off the lines 32, and the holes 48 plugged as indicated at 60. Thereafter, by pulling upon the line 58 from any suitable or convenient point at the end of the pipe, the inner bulkhead at the end of the newly laid unit adjoining the previously laid pipe may be collapsed, after which, by pulling on the line 36 at the free end of the new unit, the outer bulkhead can be collapsed and drawn to the surface, the line 32a serving likewise to withdraw, through the newly laid unit, the inner bulkhead and carrying with it the line 58 into a position to be connected with the bulkhead of a subsequent unit.

Having thus described my invention, I claim:—

1. The hereindescribed method of laying pipe in water which includes fitting the ends of a pipe unit to be laid with collapsible bulkheads, floating said unit into a position immediately over that in which it is to be set, admitting water to said unit to sink the same, and collapsing and withdrawing the bulkheads by operations performed at the surface of the water.

2. The hereindescribed method of laying pipe in water which includes fitting the ends of a pipe unit to be laid with collapsible bulkheads having attached thereto lines adapted to collapse the same and other lines adapted to hold them in extended position, making said last-named lines fast to said unit, floating said unit into a position immediately over that in which it is to be set, admitting water to said unit to sink the same, casting off said holding lines, and drawing upon said collapsing lines to collapse said bulkheads and withdraw the same.

3. The hereindescribed method of laying successive connected units of pipe in water which includes fitting the ends of a unit to be laid with collapsible bulkheads having attached thereto lines adapted to collapse the same and disposed outwardly of the unit, connecting said bulkheads by a line passing through the unit, floating said unit into a position immediately over that in which it is to be set, connecting the collapsing line of the inner bulkhead with a line passed through the previously laid pipe, admitting water to said unit to sink the same, drawing upon said last-named line to collapse the inner bulkhead, and drawing upon the collapsing line of the outer bulkhead to collapse the latter and withdraw the same, together with the collapsed inner bulkhead, from said unit.

4. The hereindescribed method of laying pipe in water which includes assembling sections of collapsible bulkheads upon erection frames and fitting them with lines adapted to hold them in extended position, inserting said bulkheads with their attached erection frames into the ends of a pipe unit to be laid, making said lines fast to said unit, and removing the erection frames.

5. A collapsible bulkhead for temporarily closing the end of a pipe, said bulkhead comprising a plurality of assembled relatively inclined interengaging sections adapted, upon the application thereto of a force acting longitudinally of the pipe in one direction, to exert a radial thrust outwardly upon the interior of said pipe, an equalizer connecting said sections, a toggle frame braced within said pipe in opposition to said bulkhead, and a line connected with said equalizer and passing about the knuckle of said toggle frame.

6. A collapsible bulkhead for temporarily closing the end of a pipe, said bulkhead comprising a plurality of assembled relatively inclined interengaging sections adapted, upon the application thereto of a force acting longitudinally of the pipe in one direction, to exert a radial thrust outwardly upon the interior of said pipe, means for applying such a force to said sections to hold said bulkhead in extended operative position, and means for applying to said sections a force in the opposite direction to collapse said bulkhead.

7. A collapsible bulkhead for temporarily closing the end of a pipe, said bulkhead comprising a plurality of assembled interengaging sections adapted, upon the application thereto of a force acting longitudinally of the pipe in one direction, to exert a radial thrust outwardly upon the interior of said pipe, a line connected with said sections through which such a force can be applied thereto, and a second line connected with said sections through which a force can be applied thereto in the opposite direction to collapse said bulkhead.

8. A collapsible bulkhead for temporarily closing the end of a pipe, said bulkhead comprising a plurality of segment-shaped sections fitting the inner surface of the pipe and collectively extending completely thereabout, a plurality of triangular sections arranged in arch formation with their bases engaging the inner edges of said first-named sections, means for applying to said triangular sections a force tending to flatten the arch and thereby hold said bulkhead in extended operative position, and means for applying to said triangular sections a force in the opposite direction to collapse said bulkhead.

9. A collapsible bulkhead for temporarily closing the end of a pipe, said bulkhead comprising a plurality of segment-shaped sections fitting the inner surface of the pipe and collectively extending completely thereabout, a plurality of triangular sections arranged in arch formation with their bases engaging the inner edges of said first-named sections, a toggle frame braced within the pipe in opposition to the arch of said triangular sections at the concave side thereof, an equalizer connecting said triangular sections, and a line connected with said equalizer and passing about the knuckle of said toggle frame.

10. A collapsible bulkhead for temporarily closing the end of a pipe, said bulkhead comprising a plurality of segment-shaped sections fitting the inner surface of the pipe and collectively extending completely thereabout, a plurality of triangular sections arranged in arch formation with their bases engaging the inner edges of said first-named sections, a toggle frame braced within the pipe in opposition to the arch of said triangular sections at the concave side thereof, an equalizer connecting said triangular sections, a line connected with said equalizer and passing about the knuckle of said toggle frame, and a line connected with said triangular sections on the convex side of the arch.

11. An apparatus for laying successive connected pipe units in water, said apparatus including a collapsible bulkhead for closing the inner end of a unit being laid and a line extending through the previously laid pipe and connected with said bulkhead for collapsing the same.

12. An apparatus for laying successive connected pipe units in water, said apparatus including collapsible bulkheads for closing the ends of a unit being laid, a line extending through said unit and connecting said bulkheads, a line extending through the previously laid pipe and connected with the inner bulkhead for collapsing the same, and a line connected with the outer bulkhead for collapsing the latter and withdrawing both bulkheads.

13. An apparatus for laying successive connected pipe units in water, said apparatus including collapsible bulkheads for closing the ends of a unit being laid, releasable lines connected with said bulkheads for holding the same in extended operative position, a line extending through said unit and connecting said bulkheads, a line extending through the previously laid pipe and connected with the inner bulkhead for collapsing the same, and a line connected with the outer bulkhead for collapsing the latter and withdrawing both bulkheads.

In testimony whereof, I affix my signature

BEARDSLEY LAWRENCE.